Patented Sept. 9, 1941

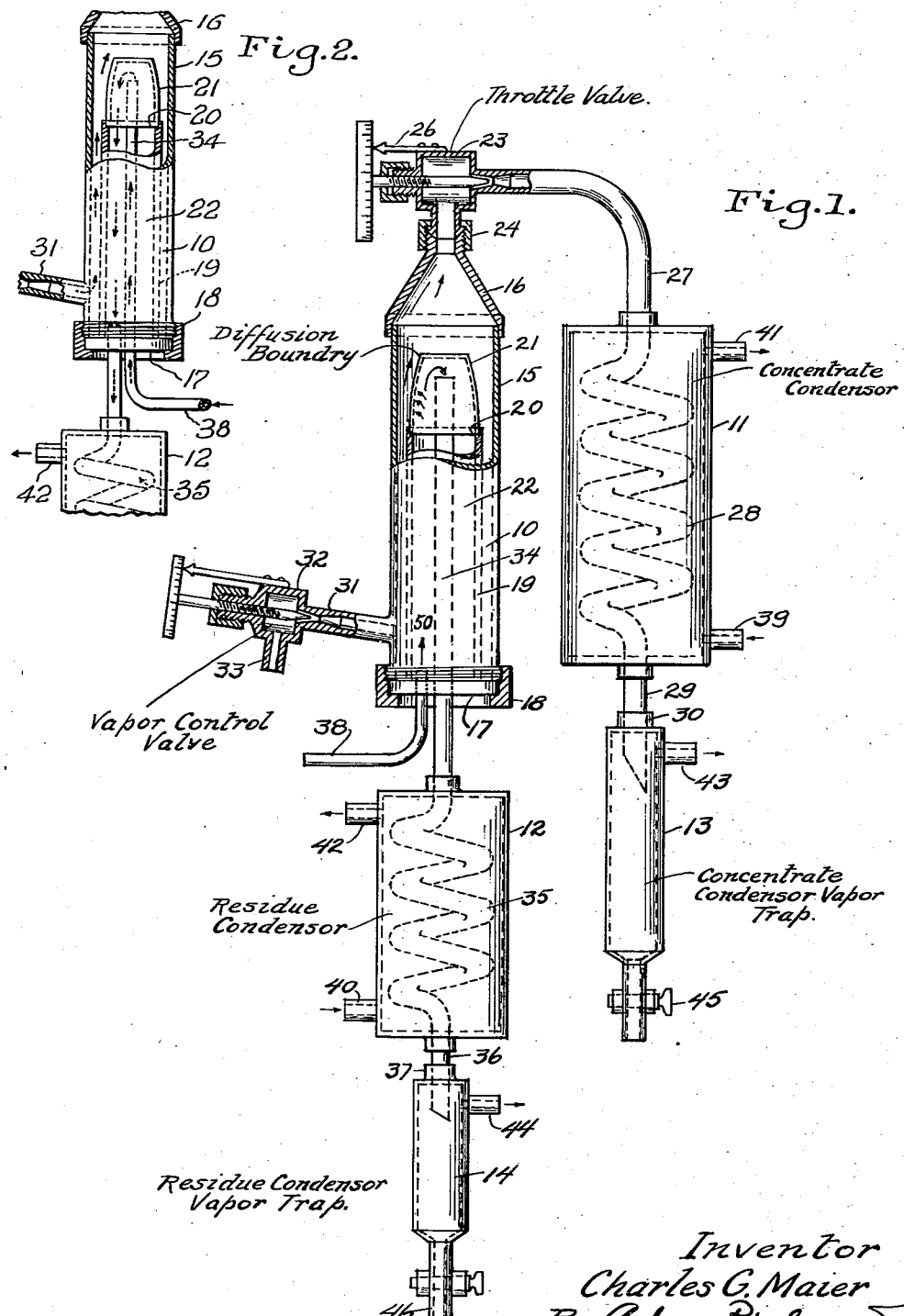

2,255,069

UNITED STATES PATENT OFFICE 2,255,069

METHOD AND APPARATUS FOR SEPARATING AND CONCENTRATING GASES

Charles G. Maier, Oakland, Calif., assignor to the United States of America, as represented by the Secretary of Interior Application March 11, 1938, Serial No. 195,422

9 Claims. (Cl. 183—115)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to a method and apparatus for the separation and concentration of gases, but more specifically it is directed to the separation of a gas stream containing a mixture of two or more gases of different molecular weights or densities, into two portions, one of which will be enriched with the constituent or constituents of lower molecular weight, and the other of which will be enriched with the constituent or constituents of higher molecular weight.

One object of the invention is to provide a method and apparatus adapted to separate the constituents of mixed gases by the purely mechanical or physical means of gas diffusion as distinguished from chemical methods of purification.

Another object of the invention is to provide a method and apparatus for concentrating gases cheaply and effectively for commercial or technical purposes.

It has long been known that when mixed gases are held in porous containers, as for example, unglazed porcelain or refractory vessels, the lighter gases tend to diffuse through the walls more rapidly at first than the heavier gases, due to the more intense molecular agitation of the lighter molecules.

This gives rise, in a closed or static system, to an increased static pressure on that side of the vessel to which the lighter molecules travel, with a corresponding decrease on the obverse side. This action soon stops the process of transfusion, whence for continuous operation the pressures must be balanced by venting the first side, and supplying fresh gas to the second.

Similar effects are observable if the vessel has a continuous impervious structure, but is provided with one or more small orifices from which the gas may escape slowly. In this instance the effect is often attributed to the molecular viscosities of the gases in question.

The invention herein described is based on the discovery that when a stream of saturated condensible vapor is permitted to flow uniformly past one surface of a permeable physical boundary, and when mixed gases of varying densities or molecular weights are caused to flow past the obverse surface, preferably in an opposite direction, and under conditions of static pressure balance on opposite sides of the boundary, beds of relatively quiescent vapor will be formed within the permeations of the boundary which collectively furnish a renewable filter composed of the molecules of the sweep vapor. These molecules may be regarded as providing canals of a size comparable to the mean free path of the diffusing gas molecules but without hydrodynamic wall friction or resistance to flow, thus permitting the utilization of molecular diffusion velocities for concentration purposes which closely approach the maximum ratios permitted by the kinetic theory. Such a filtering medium, which is continuously renewed by the condensible vapor flowing past the boundary, further permits the use of coarse permeations in the boundary, resulting in a filter which is virtually immune to plugging by suspended solid impurities in the gas, and whose greatly increased available diffusion area enormously increases the capacity per unit of surficial area of the boundary. The use of condensible vapor in this manner renders effective a physical diffusion boundary so coarsely pervious that no concentration effects whatever are detectable without the use of condensible vapor, as for example a wire screen of 100 meshes per inch.

It will be obvious that virtually balanced pressures are required on opposite sides of a diffusion boundary, if mechanical transfer other than diffusion is to be avoided. Such mechanical flow, other than true diffusion, through the boundary would obviously contaminate the concentrate with unaltered or diluted gas if the static pressure drop were from original gas to concentrate side, or neutralize the concentration effect if the pressure drop were reversed.

The invention disclosed herein supplies a continuous flow of condensible vapor at one surface of the diffusion boundary, which not only sweeps away the diffused gases, and maintains the maximum concentration gradient in the diffusion boundary, but also furnishes gaseous vapor molecules which can take the place of the diffusing molecules, and thus enables the static pressure balance on opposite sides of the boundary to be maintained. In this way it is possible to continuously maintain a purely diffusive transfer of gas molecules through the boundary under static pressure balance conditions, which prevents mechanical flow, and leads to a separation closely approaching the theoretically maximum corresponding to the requirements of kinetic gas theory.

Referring to the accompanying drawing in which corresponding parts are indicated by similar reference characters:

Fig. 1 is a fragmentary sectionized elevation, illustrating the various components of the instant invention in operative association;

Fig. 2 is a sectionized fragmentary detail illustrating the reversed connections of the feed tube and condenser when the sweep stream and gaseous mixture flow in opposite directions.

In the illustrated embodiment characterizing this invention, the numerals 10 and 22 indicate a diffusion chamber and a gas chamber which are connected respectively to a concentrate condenser 11 and a residue condenser 12. The numerals 13 and 14 indicate concentrate condensed vapor and residue condensed vapor traps connected respectively to the condensers 11 and 12.

The diffusion chamber 10 comprises a cylindrical casing 15, provided with a conical dome 16, and a circular bottom plate 17, which is held in place by an internally threaded and flanged annular retaining member 18. Within the chamber 10 is mounted an inner cylindrical supporting tube 19 provided with an annular ledge 20 at its upper extremity adapted to support a diffusion head or cap 21 which forms a pervious physical boundary for gases confined within the gas chamber 22, inclosed between the cylindrical wall of the supporting tube 19, the bottom plate 17 and the diffusion head 21.

The throttle valve 23 is connected to the conical dome 16 of the casing by the internally threaded annular union member 24 which engages threads at the upper extremity of the dome 16. The throttle valve 23, which is provided with a graduated hand wheel 25 and a pointer 26, is adapted to regulate the flow of gas from the diffusion chamber 10 to the outlet tube 27 which is formed into a condensing coil 28 within the concentrate condenser 11. The lower extremity of condensing coil 28 terminates in a tube 29 which is fitted tightly into a circularly flanged opening 30 in the top of the concentrate condensed vapor trap 13 into which the tube projects a short distance below the top.

The diffusion chamber 10 is also connected by a tube 31 to a throttle valve 32 provided with a nipple 33 through which it is connected to a boiler (not shown). The throttle valve controls the flow of vapor from the boiler to the diffusion chamber 10.

A tube 34 is centrally mounted within the cylindrical gas chamber 22 and projects through a circular opening in the bottom plate 17 and is continued into the concentrate condenser 14 where it is formed as a condensing coil 35. The lower extremity of this coil 35 terminates in a tube 36 which is fitted into the circularly flanged opening 37 in the top of the residue condensed vapor trap 13 into which the tube projects a short distance below the top. The interior of the gas chamber 22 is connected to a feeding tube 38 which projects through a circular opening in the bottom disc 17 and extends a short distance above the top of said disc.

The concentrate condenser 11 and residue condenser 14 are cylindrical chambers provided with intake tubular connections 39 and 40, and outlet tubular connections 41 and 42 respectively to provide for the circulation of a cooling fluid around the coils 28 and 35.

The concentrate condensed vapor trap 13 and the residue condensed vapor trap 14 are each cylindrical chambers provided with tubular connections 43 and 44 and drain spigots 45 and 46 respectively.

As stated in the initial discussion of this invention a blanket or layer of saturated condensible vapor in the pores or openings of a pervious physical boundary, acts as a continuously renewed filter or diffusion boundary for the separation of constituents of mixed gases which have different molecular weights or densities, and that by this means separations of the constituents of gas mixtures may be obtained under conditions approaching closely to the maximum permitted by kinetic gas theory, and corresponding to ratios of concentration in proportion to the reciprocal square roots of the molecular weights of the gases in question.

In the operation of the device, the mixed gases are passed into the gas chamber 22 through the feeding tube 38, under conditions of regulated flow. The gaseous mixture after flowing upward through the gas chamber 22 exits as a residue through the tube 34 and passes into condensing coil 35 of the residue condenser 12. From the condensing coil 35 the residue gas (with the vapor which has passed through the diffusion cap 21) is then passed into the trap 14 which collects the condensed vapor. The residue gas is withdrawn from the trap 14 through the tube 44.

Simultaneously and under conditions of regulated flow determined by the adjustable throttle valves 32 and 23, a condensible vapor is passed through the diffusion chamber 10. The vapor after flowing upward through the diffusion chamber 10 exits through the tube 27 and passes into condensing coil 28 within the concentrate condenser 11. From the condensing coil 28 the vapor (with gas which has passed through the diffusion cap 21) is then passed into the trap 13 which collects the condensed vapor. The gas is withdrawn from the trap 13 through the tube 43. As the condensible vapor and the gaseous mixture traverse opposite surfaces of cap 21 under conditions of static pressure balance, one of the components of said gaseous mixture will be extracted through the cap and diffused in the condensible vapor whereupon the vapor and gas are separated and collected.

In disclosing the principles and means by which the condensible vapor is utilized to afford a separation of mixed gases by physical diffusion means, I illustrated the disclosure by reference to an apparatus used to confirm the efficacy of this method. This apparatus as above described contains a new combination of elements producing an effectiveness of concentration by diffusion impossible to attain by previously known methods. As illustrated in the drawing, the elements of this apparatus are: (1) a pervious physical boundary or cap 21; (2) an assembly of ducts and jacket or casing 19, 34 and 15, for passing continuous streams of gas to be concentrated, and saturated condensible vapor along and past opposite sides of the physical boundary 21; (3) means of controlling the ingress and flow of condensible vapor (vapor control throttle valve 32); (4) means of virtually balancing the static pressure on opposite sides of the boundary by inserting a throttle valve at the exit of the diffusion chamber 10; (5) separate tubular condensers 11 and 12 on the exit lines of vapor and gas flow (concentrate and residue condensers), and (6) separate traps 13 and 14 at the exit of the above condensers, where the condensed vapors are separated from the enriched and residue gases.

The diffusion boundary or cap 21 may be either metallic or refractory masses. The most effective sizes of openings or apertures through the boundary have been found to be from 0.01 inch to 0.0005 inch, but in general the coarser openings of the order of 0.005 inch are to be preferred. Metallic boundaries may be screen or cloth made of wire or ribbon, or perforated or slotted sheet metal. It is desirable to maintain the thickness of such metallic boundaries as small as is consistent with requisite mechanical properties, and may preferably be between .005 and .015 inch. Refractory masses such as porcelain, bonded alundum or silica, or fritted glass should have openings of similar size and appropriate thicknesses are .05 inch to .10 inch.

In the drawing, the feed gas is shown passing upward along the inner surface of the diffusion boundary, and out through the central exit tube 34. The vapor passes in the same direction on the exterior surface of the boundary. When boundaries of greater length are used, it will be desirable to introduce the feed gas through the central tube 34, and connect the condenser to the annular space between tube 34 and casing 15 as shown in Fig. 2 of the drawing, thus reversing the direction of flow past the boundary, and ensuring counter-current conditions at the diffusion boundary. Further, it may be desired in some instances to utilize the inner side of the boundary for the vapor. All of these variations are matters of expediency and design which do not affect the principles involved, and may be selected to suit the requirements of the particular installation involved.

It is desirable to prevent the presence of condensed vapor droplets about the cap 21 which would tend to be drawn in the liquid state into the pores or apertures by capillary forces, and thus partially or wholly prevent the diffusion of gases through openings. To prevent this the diffusion chamber 10 may be surrounded with thermal insulation, an accessory vapor jacket, or electric heating coils, by which means the temperature may be kept near 140-150° C. in those instances when steam is used as the condensible vapor. When other vapors are used, the temperature of the boundary should be maintained 25 to 75 degrees above the normal boiling point of the liquid being vaporized.

In most instances, steam will be preferred as the condensible vapor, because of its cheapness and general availability, especially in those cases when low-pressure or waste steam may be available. For those concentrates involving gases highly soluble in water, or where contamination by small quantities of uncondensed water would be undesirable, it may be preferred to utilize other condensible vapors such as those of hydrocarbons, chlorinated hydrocarbons such as carbon tetrachloride or chloroform, organic or inorganic liquids of suitable boiling points, or low boiling metals such as mercury. While theoretical analysis of the process of diffusion under the conditions of this apparatus shows that the properties of the condensible vapor largely cancel out of the equations for net diffusion, the effect of using vapors of markedly different molecular weights is in general that heavier vapors, because of their lesser velocities of thermal agitation give diffusion blankets corresponding to finer filtering mediums. The chief criterion for selection of vapor will be the suitability of the gases to be concentrated from the standpoint of solubility, and possible chemical reactivity, as well as economy, rather than necessary selection of intermolecular distances. It is nevertheless true that the heavier molecules will better resist displacement by molecular collision with the gases to be treated, and thus produce a more perfect blanket, but this may be at the cost of lowered capacity.

The vapor control valve may be of any conventional design suited to the vapor used, but since relatively small quantities of vapor (as for example 1.5 to 3.0 grams of steam per liter of gas) are requisite, it may preferably be of the needle type, with a graduated indicator by which the vapor quantities may be controlled with a fair degree of accuracy.

Under normal conditions of operation the greater quantity of the condensible vapor flows out of the diffusing chamber along with the concentrate gas, and when, after passing the throttle valve it reaches the concentrate condenser, a partial vacuum is created on this side which is greater than the partial vacuum created by the condensation of the relatively small amount of vapor condensed from the residue gas. When the throttle valve is wide open, this tends to cause the pressure on the vapor side of the diffusion boundary to be less than on the gas side, whence large quantities of gas are sucked through the boundary, and its effectiveness as diffuser is impaired. The control of the operation consists, after setting the vapor flow at a desired point, in closing the throttle valve until the pressure drop through it just compensates for the vacuum effect of the condenser, whence a virtual static pressure balance obtains in the vicinity of the boundary, and purely diffusive flow is maintained through it.

The amounts of vapor expressed as volume are from 2.5 to 7.5 times the amount of gas treated, whence it is clear that the throat of the throttle valve must not be too small. Such a condition would produce an excess of positive static pressure on the vapor side, and prevent diffusion in the boundary by backward flow. The preferred throttle valve will show virtually no pressure drop when wide open, but will be finely adjustable. Here again a graduated indicator stem is advantageous.

The concentrate and residue condensers and traps may be of conventional design, although the tubular types are preferable. The only requirements for this specific purpose are that there must be no opportunity for the passages to become obstructed with accumulated liquid, which would cause pressure fluctuations, destroying the balanced conditions at the boundary which control the effective operation of the diffuser.

In commercial use, it will be desirable to provide this apparatus with various measuring devices to assist in the control. These have not been shown in the sketch, since they are not essential parts of the apparatus. Especially useful is a thermal conductivity meter of the hot filament type placed in the concentrate gas exit line. This may be calibrated to show directly the grade of concentrate produced. A differential pressure gauge between vapor and gas and a vapor flow meter are also useful adjuncts in maintaining the conditions necessary for purely diffusive flow through the boundary.

In operation I have found this apparatus requires steam flow rates of from 1 to 5 grams per minute to function most effectually, while 0.25 to 1.25 liters per minute of feed gas are admitted to gas chamber 22. The steam used is low pressure steam in the form of dry saturated vapor, and in order to prevent condensation in the separator it is preferable to surround the casing 15 of the diffusion chamber 10 with a heated jacket (which I have not shown since it is not an essential part of the method, so that the temperature within the chamber is maintained near 140–160° C.

It is immaterial whether the vapor be on the inside or the outside of the boundary formed by the head or cap 21, or what the shape or disposition of the boundary may be. In general, boundaries with coarser porosity are preferred, and it has been found that pore dimensions of 0.01 inch to .0005 inch are most suited for the purpose. The thickness of the diffusion boundary is preferably kept as low as consistent with fair mechanical strength, for example from 0.010 inch for metallic boundaries to 0.05–0.07 inch for refractory porous materials. For metallic boundaries, either screens woven from wire or ribbon, metallic cloth, perforated or slotted plates may be used.

Unglazed refractory masses of porcelain, sillimanite, alundum, silica, fritted glass or other chemically inert materials may be used.

The material used for condensible vapor may be varied to suit the economic and practical requirements of the process. Steam is preferred as cheapest for those cases where the gases to be separated are only slightly soluble in water, but treatment of other gases may preferably indicate the use of volatile hydrocarbons, chlorinated hydrocarbon derivatives such as carbon tetrachloride, or even metallic vapors such as mercury or low boiling metals. For example, hydrogen may be concentrated from mixtures with anhydrous hydrochloric acid gas using mercury vapor without contaminating the gases with small quantities of uncondensed water, when they must be maintained in the dry condition.

The method will obviously operate at any desired pressures, but for most purposes, pressures near atmospheric are preferred as most economical.

Since the maximum ratio of concentration is limited by kinetic theory to the inverse square roots of the molecular weights of the gases in question, it may sometimes be necessary to repeat the concentration process several times to secure a substantially pure concentrate gas from a feed gas originally having a low concentration of the lighter gas. In this connection, I have found that coarse diffusion boundaries give higher ratios of concentration, with moderate recoveries and the finer boundaries give higher recoveries with moderate concentration so that I may prefer to use a series of fine and coarse boundaries in combination to secure high grade concentrates and good extractions.

The continuous supply of condensible vapor at one side of a permeable boundary more or less automatically ensures an approximate balance of static pressures on opposite sides of the boundary, since any lighter molecules diffusing out are readily and quickly replaced by vapor molecules passing in the opposite sense. It is found that the chief function of the throttle valve shown at the exit of the diffusion chamber is to control the portion of gas diffusing, and consequently the ratio of concentration. If it is wide open, a large portion of the gas may pass outwardly through the boundary, resulting in moderate ratios of concentration, but high extractions. Conversely, increasing closure of the valve causes the grade of concentrate to be increased, but of course, lower extractions are then secured. The setting of this valve then serves to control the conditions of operation to those most economical for the required effect.

Having described my invention, what I claim as new and wish to secure by Letters Patent is:

1. An apparatus for separating and concentrating gases, including a cylindrical diffusion chamber provided with inlet and outlet valve controlled conduits, a gas chamber comprising a supporting tube mounted centrally within the diffusion chamber and spaced from the side wall thereof, a cup-shaped pervious diffusion cap mounted at the top of said supporting tube, an intake conduit connected to said gas chamber terminating at the bottom thereof, and an outlet conduit projecting centrally within said gas chamber and terminating adjacent the inner surface at the upper extremity of said diffusion cap.

2. The method of atmolysis which consists in producing two continuously flowing streams, one being a gaseous sweep stream, the other a gaseous mixture, directing the respective streams over the opposite surfaces of a permeable physical boundary, causing the molecules of the sweep stream to fill the permeations of the physical boundary, regulating the velocities of the respective streams to balance the static pressure heads prevailing at the extremities of said permeations, whereby to provide a continuously renewable vapor septum, diffusing one of the components of the gaseous mixture through the septum and utilizing the sweep stream to converge the diffused gas as it emerges from the septum to a condensing system.

3. The method of atmolysis which consists in producing two continuously flowing streams, one being a condensible vapor, the other a gaseous mixture, directing the respective streams over the opposite surfaces of a permeable physical boundary, causing the permeations of the boundary to be filled with the molecules of the vapor, regulating the velocity of the two streams to equalize the static pressure heads at the extremities of the permeations in the physical boundary, whereby to prevent hydrodynamic flow of the molecules within the permeations of the boundary and to form a renewable vapor septum, diffusing one of the components of the gaseous mixture through the septum and immediately directing the mixture of vapor and diffused gas to a condenser system.

4. An atmolizing unit comprising a pair of ducts arranged in parallel and adjacent relations, and having inlet and outlet ends, one of said ducts being adapted to function as a vapor conduit, the other as a conduit for a gaseous mixture, a series of cross ducts interconnecting the conduits, a source of condensible sweep vapor in controlled communication with the inlet end of said vapor conduit, a source of mixed gases in controlled communication with the inlet end of said gas conduit, condensing means in connection with the outlet end of each of said conduits, one of said condensing means including a valve adjustable to control the vacuum effect produced by said condenser means and regulate flow of the condensible vapor and mixed gases through said conduits to said condensing means whereby to balance the static pressureheads prevailing at the extremities of the cross ducts, and provide a vapor septum between the conduits through which one of the components of said gaseous mixture is adapted to pass.

5. An atmolizing unit comprising a pair of ducts arranged in parallel and adjacent relation and having inlet and outlet ends, one of said ducts being adapted to function as a vapor conduit, the other as a conduit for a gaseous mixture, a source of condensible vapor in controlled communication with the inlet end of the vapor conduit, a source of mixed gases in controlled communication with the inlet end of the gas conduit, a series of cross ducts interconnecting the conduit and grouped adjacent the outlet ends of said parallel ducts, condensing means in connection with the outlet ends of each of said conduits, one of said condensing means including a valve adjustable to control the vacuum effect produced by said condenser means to regulate flow of the condensible vapor and gaseous mixture through said conduits to the condensing means whereby to balance the static pressureheads prevailing at the extremities of the cross ducts, and provide a vapor septum between the ducts through which one of the components of the gaseous mixture is adapted to pass.

6. The method of atmolysis which consists in producing two continuously flowing streams, one being a sweep stream, the other a gaseous mixture, causing the respective streams to flow in opposite directions over the opposing surfaces of a vapor septum under conditions of balanced static pressures, diffusing one of the components of the gaseous mixture through the septum into the sweep stream and directing the sweep stream with its diffustate to a recovery system.

7. The method of atmolysis which consists in producing two streams flowing continuously in opposite directions, one being a sweep stream of condensible vapor, the other a gaseous mixture, directing the respective streams under conditions of regulated flow and balanced static pressures over the opposite surfaces of a diffusion boundary, diffusing one of the components of the gaseous mixture through the boundary and into the sweep stream and utilizing the sweep stream to convey the diffusate to a condensing system.

8. An atmolizing unit comprising a sweep stream and a feed gas duct arranged in parallel and adjacent relation and having inlet and outlet ends, a source of sweep stream under pressure and in controlled communication with the inlet end of the sweep stream duct, a series of cross ducts interconnecting the sweep stream and the feed gas ducts, and adapted to be filled with the molecules of the sweep stream whereby to provide a molecular septum, a source of mixed gases under pressure and in controlled communication with the inlet end of the feed gas duct and recovery systems connected with the outlet ends of the sweep stream and the feed gas ducts, one of said systems including a valve adjustable for regulating the vacuum effect of said system on the flow of the sweep stream and the mixed gases along their respective ducts to the recovery systems, whereby to establish balanced static pressure conditions at the extremities of the cross ducts and on opposite sides of the molecular septum, while one of the components of the gaseous mixture passes through the septum into the sweep stream.

9. An atmolizing unit comprising a sweep stream and a feed gas duct arranged in parallel and adjacent relation and having inlet and outlet ends, a source of sweep stream under pressure and in controlled communication with the inlet end of the sweep stream duct, a series of cross ducts interconnecting the sweep stream and the feed gas ducts, said cross ducts having diameters within the range .005 inch to .015 inch and being adapted to be filled with the molecules of the sweep stream, whereby to provide a molecular septum, a source of mixed gases under pressure and in controlled communication with the inlet end of the feed gas duct, and recovery systems connected with the outlet ends of said sweep stream and feed gas ducts, one of said systems including a valve adjustable for controlling the vacuum effect of said recovery system on the sweep stream and the mixed gases to regulate their flow along the sweep stream and feed gas ducts to the recovery systems, whereby to establish balanced static pressure conditions at the extremities of the cross ducts, and on opposite sides of the molecular septum, while one of the components of the gaseous mixture passes through the septum and into the sweep stream.

CHARLES G. MAIER.